(12) United States Patent
Ahler et al.

(10) Patent No.: US 9,051,832 B2
(45) Date of Patent: Jun. 9, 2015

(54) SENSOR DEVICE AND METHOD FOR THE GEOELECTRICAL PROSPECTING OF RAW MINERAL DEPOSITS

(75) Inventors: Marco Ahler, Mulheim a.d. R. (DE); Simon Pauli, Hannover (DE); Thomas Kopp, Lohra (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 312 days.

(21) Appl. No.: 13/395,065

(22) PCT Filed: Sep. 3, 2010

(86) PCT No.: PCT/IB2010/053975
§ 371 (c)(1),
(2), (4) Date: Apr. 9, 2012

(87) PCT Pub. No.: WO2011/030268
PCT Pub. Date: Mar. 17, 2011

(65) Prior Publication Data
US 2012/0182016 A1   Jul. 19, 2012

(30) Foreign Application Priority Data
Sep. 10, 2009   (DE) .......................... 10 2009 043 972

(51) Int. Cl.
*E21F 13/06*  (2006.01)
*G01V 3/15*  (2006.01)

(52) U.S. Cl.
CPC ............... *E21F 13/066* (2013.01); *G01V 3/15* (2013.01)

(58) Field of Classification Search
CPC .......... G01V 3/165; G01V 3/16; G01V 3/17; G01R 27/02
USPC .................................. 324/328, 373, 207, 648
See application file for complete search history.

(56) References Cited

U.S. PATENT DOCUMENTS

| 3,828,242 A | * | 8/1974 | Vann ............................ 324/328 |
| 3,970,927 A | * | 7/1976 | Ladbrooke et al. ............. 324/67 |
| 4,199,720 A | * | 4/1980 | McNeill ........................ 324/334 |

(Continued)

FOREIGN PATENT DOCUMENTS

| DE | 196 27 312 C1 | 11/1997 |
| DE | 20 2006 018 980 U1 | 4/2007 |

(Continued)

OTHER PUBLICATIONS

Office Action received Apr. 2014 regarding Russian Application No. 2012113808, 4 pages.

*Primary Examiner* — Arleen M Vazquez
*Assistant Examiner* — Dominic Hawkins
(74) *Attorney, Agent, or Firm* — Foley & Lardner LLP (57) ABSTRACT

A sensor device and a method for the geoelectrical prospecting of the location, the (stratigraphic) arrangement, and the course of raw mineral deposits and of the adjoining rock delimiting these deposits, particularly in the continuous working of the mineral deposits, having a sensor head whose front surface forms the sensor measuring surface, and at least one electrode. The sensor head can make contact with a ground surface, and a central electrode and a plurality of outer electrodes distributed geometrically uniformly around the central electrode are arranged on the sensor measuring surface, the central electrode and the outer electrodes being electrically conductive and electrically separated from one another.

33 Claims, 4 Drawing Sheets

(56) References Cited

U.S. PATENT DOCUMENTS

| | | |
|---|---|---|
| 4,412,180 A | 10/1983 | Desbrandes |
| 4,468,623 A | 8/1984 | Gianzero et al. |
| 4,888,462 A * | 12/1989 | Diot et al. .................... 219/69.2 |
| 5,036,283 A | 7/1991 | Trouiller et al. |
| 5,371,959 A * | 12/1994 | Ahs ................................ 37/443 |
| 5,734,091 A * | 3/1998 | Kudo et al. .................... 73/23.2 |
| 5,763,795 A * | 6/1998 | Tanaka et al. ............... 73/863.73 |
| 6,541,977 B2 * | 4/2003 | Sneed et al. ................... 324/326 |
| 2002/0060576 A1 * | 5/2002 | Tominaga ...................... 324/715 |
| 2003/0009286 A1 * | 1/2003 | Shibusawa et al. ............... 702/2 |
| 2004/0095154 A1 * | 5/2004 | Lundstrom et al. ........... 324/694 |
| 2005/0012499 A1 * | 1/2005 | La Rosa et al. .......... 324/207.15 |
| 2005/0093548 A1 * | 5/2005 | Ueda et al. .................... 324/357 |
| 2005/0134278 A1 * | 6/2005 | Nichols ......................... 324/348 |
| 2005/0206385 A1 * | 9/2005 | Strack et al. .................. 324/347 |
| 2006/0145707 A1 * | 7/2006 | Ooe ............................... 324/661 |
| 2006/0158199 A1 * | 7/2006 | Bristow et al. ................ 324/663 |
| 2008/0297169 A1 * | 12/2008 | Greenquist et al. ........... 324/600 |
| 2009/0051371 A1 * | 2/2009 | Morimoto ..................... 324/661 |
| 2009/0189485 A1 * | 7/2009 | Iyoki ............................. 310/317 |
| 2010/0045282 A1 * | 2/2010 | Shibasaki et al. ............. 324/249 |

FOREIGN PATENT DOCUMENTS

| | | |
|---|---|---|
| DE | 10 2007 029 782 A1 | 12/2008 |
| GB | 1 346 503 A | 2/1974 |
| JP | 63-88487 A | 4/1988 |
| JP | 05-293520 | 11/1993 |
| SU | 263763 | 2/1970 |
| SU | 1101716 | 7/1984 |
| SU | 217318 | 6/1986 |

\* cited by examiner

SENSOR DEVICE AND METHOD FOR THE GEOELECTRICAL PROSPECTING OF RAW MINERAL DEPOSITS

The invention relates to a sensor device for the geoelectrical prospecting of the location, the (stratigraphic) arrangement and the course of raw mineral deposits, and to the adjoining rock delimiting these deposits, particularly in the continuous exploiting of the mineral deposits, having a sensor head whose front surface forms the sensor measuring surface, and at least one electrode. The invention also relates to a method for the geoelectrical prospecting of raw mineral deposits in the ground, in particular in continuous working of the mineral deposits, a potential field being built up in the ground with aid of a sensor device which comprises a sensor head whose front surface forms the sensor measuring surface and which has at least one electrode.

BACKGROUND OF THE INVENTION

It is known in the field of applied geophysics to prospect the Earth's crust by measuring electric voltage and current intensity. For example, for the purpose of prospecting mineral ore deposits DE 10 2007 029 782 A1 discloses a geophysical measuring method in which various prospecting methods from geophysics, such as seismic reflection technology, seismic refraction technology and resistance geoelectrical technology with boreholes, digging and an analytical approach, are combined in order to prospect a mineral deposit undergoing weathering. For the purpose of the prospecting using resistance geoelectrical technology, steel ground spikes are used as electrodes with which a current is fed into the soil by means of a voltage source so as to build up in the ground potential fields which, for example, are measured with the aid of a voltmeter. The profile and decaying of the potential fields can be used to determine a contact resistance which, as apparent conductivity or resistance is representative of the soil or the structure of the soil and the materials and structures occurring there. In the case of resistance geoelectrical technology, it is also necessary to take account of the physical processes of the induced polarization (IP effects) which, as a function of the soil present, mostly lead to a rise and decay of the measurement potential fields than the applied potential fields which occur more slowly in different ways.

SUMMARY OF THE INVENTION

It is an object of the invention to provide a sensor device and a prospecting method for the ground prospecting, in particular the mineral deposit prospecting, which enables prospecting of the course and structure of the mineral deposit as well as the bordering course of the adjacent rock in continuous working, and thus also, indirectly, control of a winning device used to work the mineral deposit.

This object and others are achieved as concerns apparatus by virtue of the fact that the sensor head can make contact with a surface of the ground and/or the mineral deposit, and a central electrode and a plurality of outer electrodes distributed geometrically uniformly around the central electrode are arranged on the sensor measuring surface, the central electrode and the outer electrodes being electrically conductive and electrically separated from one another. Owing to the fact that the sensor head is only brought into contact with the ground surface of the ground to be prospected without penetrating physically into the soil itself, as was the case with ground spiking, the inventive sensor device can, for example, also be used on conveying installations of winning machines. At the same time, the geometrically uniformly distributed arrangement of the electrodes enables preliminary prospecting of ground layers laterally and perpendicularly in relation to the ground surface with which contact is made. It goes without saying that the prospecting can be carried out downwards, forwards and also upwards providing, for example, that the sensor heads make contact with the surface of a perpendicular or sloping working face, or with the roof of an underground mineral deposit. The individual electrodes on the sensor head can be used to form sensor pairs with the aid of which an alternating voltage is applied to the ground to be prospected, and the current produced in the ground can be measured at the same time. All feeding operations and measurements are performed by the electrodes of the sensor head on which the electrodes are arranged as outer electrodes or inner electrodes.

In accordance with an advantageous embodiment, the central electrode on the sensor measuring surface has an equilateral front surface, and the outer electrodes on the sensor surface have a linear front surface, the outer electrodes then being respectively arranged parallel to one of the side legs of the central electrode. The sensor head can therefore then be configured such that the central electrode forms a triangle, a quadrilateral or a polygon, and a number of outer electrodes are provided which corresponds to the number of corners.

In an alternative embodiment, the central electrode on the sensor measuring surface is designed as a point electrode. It is particularly advantageous when the central electrode on the sensor measuring surface is designed as a ring electrode. In both refinements, the outer electrodes on the sensor measuring surface could be respectively designed as point electrodes. However, there is more advantage in a sensor head in which the outer electrodes on the sensor measuring surface are designed as annular-segment electrodes and are arranged annularly around the central electrode, preferably itself annular. Such a refinement forms a sensor head with a ring/ring arrangement of the electrodes.

The principle field of application of the inventive sensor device relates to the prospecting of mineral deposits which can be worked using plough systems or cutting systems. In the case of such working systems, the sensor device can be installed in parts of the winning machine in order during continuous working to obtain information relating to the thickness and the structure of the mineral deposit, as well as the course of the boundary layer between raw material to be worked and adjoining rock. In the case of underground mineral deposits in coal mining, the ground is frequently designated as 'lying', the roof has 'hanging' and the front wall to be worked as working front or 'working face'. For the purpose of integration in the machine, it is particularly advantageous when the sensor device has a cylindrical housing at one of whose cylinder ends the sensor head is arranged. In order to achieve the making of reliable contact even when the underground is rough, the annular-segment electrodes forming the outer electrodes on the sensor measuring surface are designed as annular-segment webs which extend on a front surface of the sensor head and on a lateral surface of the sensor head. For this reason, the ring/ring arrangement is best suited, a ring/point arrangement is moderately suited and a point/point arrangement is worst suited for the application to a machine being moved during working. In order to avoid possible unevennesses, it is, furthermore, advantageous when the outer electrodes in the shape of annular webs are provided at the transition of the front surface into the lateral surface with a chamfer of preferably 45°.

Since a relatively long overall length can be required to integrate the sensor device, it is advantageous when in this refinement the outer electrode(s) on the rear side of the annular-segment web is/are provided with a contact strip which extends up to the rear end of the housing. Furthermore, it is expedient to provide the housing with a step so that the step shoulder can form a bearing surface for a compression spring with the aid of which the sensor device is permanently pressed into contact with the surface of the soil or mineral deposit which is to be scanned. For this purpose, the housing can be of multipart design and have a rear part, comprising the step shoulder, and a front part, provided with the sensor head, it being possible to screw the housing parts to one another through the step shoulder in order to attain as simple a design as possible. In addition, centring pins can be, or are detachably fastened on the housing with the aid of the screw fitting. The centring pin(s) can also be integrally designed on the housing.

The radii of the rings and the width of the rings, inter alia, are decisive in the case of a ring/ring arrangement of the electrodes. The larger the radius of the outer ring, the greater the prospecting depth. Once to twice the diameter of the outer ring is the guide magnitude for the prospecting depth. The sensor device is essentially composed of two rings, the outer ring comprising a plurality of outer electrodes, in order at least to form with two adjacent outer electrodes in each case an electrode pair for introduction of a potential field into the ground to be prospected. The radius ratio between the radius, formed from the outer electrodes to a central axis, and the radius formed from the inner electrode to the central axis is preferably approximately 3/1. Furthermore, the outer electrodes preferably form a ring with a ring diameter of at least 60 mm. The outer ring electrodes can have a width in the radial direction of approximately 1/10 of the radius formed with the outer electrodes, and/or the spacing between two outer electrodes, which is filled with insulation material, is preferably at least 2 mm.

It is particularly advantageous for the use of the sensor device on moving winning machines when the outer electrodes on the sensor measuring surface consist of steel. Furthermore, the interspace between the outer electrodes and the central electrode on the sensor surface should be filled up with a preferably wear-resistant insulation material such as a modified plastic, in particular a fibre-reinforced thermoplastic so that no bodies which prevent the sensor surface from making contact with the ground to be scanned can settle on the sensor surface.

In the case of the particularly preferred refinement, the sensor device can be used on a trough element of an underground winning machine, in particular an underground coal winning machine. Here, the sensor device can preferably be inserted into a downwardly open, cylindrical cutout on the trough element and, in the mounted position, move in the cutout, if appropriate against the restoring force of a compression spring. Alternatively, the sensor head can be arranged on a pivot arm which is pivotally supported on the underside of the trough element.

As to its method, the above object is achieved by virtue of the fact that the sensor head can make contact with a surface of the ground and has on the sensor measuring surface a central electrode and a plurality of outer electrodes which are arranged distributed geometrically uniformly around the central electrode, the central electrode and the outer electrodes being electrically conductive, electrically separated from one another, and forming electrode pairs with the aid of which a potential field is built up and the current produced is measured. A suitable control and measuring device can be used to couple all the electrodes one after another to form electrode pairs, and build up successive potential fields and carry out measurements. The specific resistance of the material in the soil can be determined by the application of a voltage and/or the injection of a current between electrodes of an electrode pair at the soil as potential fields, and by measuring the voltage and current profiles which are produced. The measurement can be carried out both in the case of a stationary sensor head and in the case of a sensor head which, for example, also passively moves the winning machine along within. The measurement of the current produced as a function of the ground to be prospected is preferably performed with the aid of the electrodes of the electrode pair which are currently building up the potential field. However, the measurement can also be performed with the aid of electrodes of an electrode pair currently not building up a potential field, or of any other desired electrode pair of the same sensor head.

Furthermore, electrochemical processes give rise to an induced polarization or a polarization effect which is caused, for example, on the one hand, by differences in the ion conductivity of the stone and the electron conductivity of metallic stone particles and, on the other hand, by spatially dependent ion mobility, which are based on changing pore size in the stone. So that a polarization can build up, there is a need for electrical work. This can be measured on switching on the voltage for building up the potential fields. If the voltage is switched off, this releases once again the work stored in the ground in the form of electrical energy, as becomes visible, in turn, in the voltage profile.

During a movement of the sensor head along the surface of the ground, it is possible to measure a change in the contact resistance between the electrodes of one of the electrode pairs. To this end, it is also possible for individual electrodes to be short-circuited to form a common electrode or large electrode, and to form a measuring electrode pair together with a further short-circuited electrode, if appropriate once again as large electrode, of the same sensor head as counter-electrode, in order to provide as large as possible a surface making contact with the ground for the measuring electrodes and the ground surface to be scanned. Changes in the contact resistance can result from the movement of the sensor heads over the ground surface to be scanned. The amplitude and frequency of these resistance fluctuations are a function of the nature of the surface of the material. The method can be applied only in the case of dynamic processes.

It is particularly advantageous in the case of the inventive method when the equivalent resistance between all the electrode pairs of the sensor head is measured in order to prospect the specific resistance of the material in the ground or in the mineral deposits in front of the sensor head making contact with the surface of said ground. The potential fields or the contact resistance are/is preferably determined without penetrating into the ground with the sensor head. A sensor device such as has been described further above is used, in particular, to carry out the method.

These and other objects, aspects, features, developments and advantages of the invention of this application will become apparent to those skilled in the art upon a reading of the Detailed Description of Embodiments set forth below taken together with the drawings which will be described in the next section.

DETAILED DESCRIPTION OF EMBODIMENTS

Figure 1:
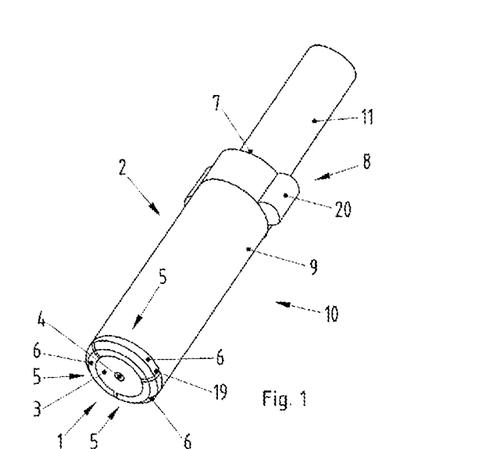
FIG. 1 shows a diagrammatic perspective view of a sensor with a sensor head with a point/ring arrangement of the electrodes for earth prospecting in accordance with a first exemplary embodiment.
Figure 2:
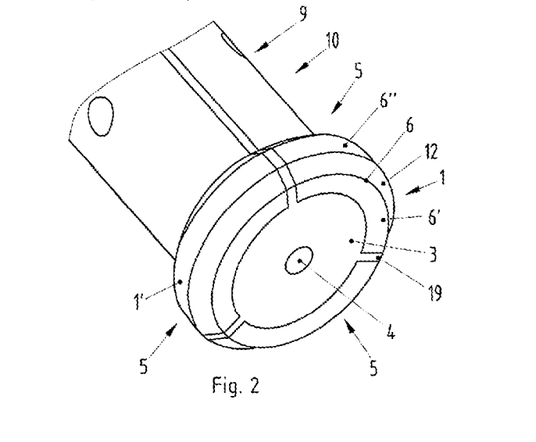
FIG. 2 shows a detail view of the sensor head of the sensor from FIG. 1.
Figure 3:
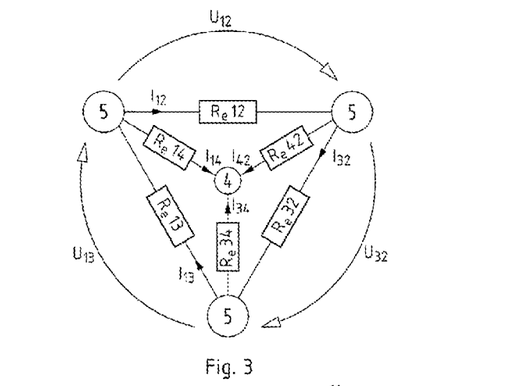
FIG. 3 shows an equivalent circuit diagram of the equivalent resistances and electric voltages in the case of an electrode arrangement on the sensor head in accordance with FIGS. 1 and 2.

Referring now to the drawings wherein the showings are for the purpose of illustrating preferred and alternative embodiments of the invention only and not for the purpose of limiting same, FIGS. 1 to 3 show the design of a sensor device according to a first exemplary embodiment which is designated as a whole by the reference 10. FIGS. 1 to 3 show the sensor device in a very diagrammatically simplified fashion, all that is shown of the sensor device being the "apparatus" sensor without voltage sources, cables and control computer. The sensor device 10 or the sensor is provided with a sensor head 1 at one end of a cylindrical housing 2. The sensor head 1 has a sensor measuring surface 3 at the centre of which there is arranged a central point electrode 4 arranged about which are, symmetrically uniforms distributed three outer electrodes 5 which respectively consist on the sensor measuring surface 3 of annular segment webs 6. The sensor head 1 therefore has a point/ring arrangement of the central electrode 4 and the three outer electrodes 5. The sensor device 10 together with the sensor head 1 are designed for the purpose of being brought into permanent contact with the surface of the ground (not illustrated) of a mineral deposit. This can preferably be achieved with a compression spring (likewise not illustrated) which can be supported on a step shoulder 7 of a step 8 between a front part 9 and a rear part 11 of the substantially cylindrical housing 2. The compression spring (not illustrated) can then be used to pretension the sensor device 10 in the axial direction, thus being able to achieve the aim that, as will be explained later, the sensor head 3 permanently overhangs a surface on a winning machine and permanently bears against the surface of the ground. Depending on working progress of a mineral deposit, the ground can here be a ground layer which does not yet contain the minerals to be won, a ground layer which consists exclusively of the minerals to be won, or else a boundary layer which consists either of adjoining rock which is not to be further worked, or else of a mineral layer which is to be worked as accurately as possible.

As is shown particularly clearly in FIG. 2, in which the cylindrical housing at the front part 9 is omitted, for the purpose of using the sensor device 10 in machine parts of winning machines the angular-segment webs 6 of the outer electrodes 5 extend on the sensor head 1, firstly, with a face web 6' on the sensor measuring surface 3 and, secondly, also with a lateral web 6" on a lateral surface of a sensor head 1 denoted on the whole by the reference numeral 1'. The face web 6' and the lateral web 6" are preferably integrally connected to one another here, and there is formed between the two a sloping chamfer 12 whose angle preferably effects a 45° transition between the lateral web 6" and the face web 6' of the annular-segment web 6 of each outer electrode 5. The chamfer 12 can ensure that, to the extent that it is displaced parallel to a ground surface against which it bears, the sensor head 1 can be automatically raised upon striking obstacles and can be displaced against the return force of the compressions spring (not shown) without the need for additional measures to raise the sensor device having to be taken.

It is already relatively well in evidence from FIGS. 1 and 2 that the three electrically conductive outer electrodes 5 and the electrically conductive central electrode 4 are electrically separated from one another via insulating intermediate material in order, depending on the outlay on measurement, to form with in each case two adjacently lying outer electrodes 5, and/or with in each case a pair consisting of central electrode 4 and one of the outer electrodes 5, electrode pairs to which it is possible to apply a potential field, such as a voltage for example, via the supply source (not shown) in order to determine the apparent specific resistance $\rho$ in the ground—as, in particular, in the so-called lying wall of an underground coal seam. Reference is now firstly made to FIG. 3 which illustrates, with the aid of an equivalent circuit diagram, how the apparent specific resistance $\rho$ of a material in the ground or in a mineral deposit can be determined by using the inner and outer electrodes 4, 5.

FIG. 3 shows in an equivalent circuit diagram the equivalent resistances and electrical voltages for an electrode arrangement of the inner electrode 4 and three outer electrodes 5 on the sensor head 1 in accordance with FIGS. 1 and 2. In order to determine the apparent specific resistance $\rho$ of the material in the ground or the mineral deposit as, for example, in the lying wall of a coal seam, the equivalent resistance $R_e$ is measured between all electrode pairs which can be formed with the inner electrode 4 and the outer electrodes 5. The equivalent resistance is a series circuit composed of the contact resistances $R_c$ of the electrodes in relation to the lying wall, and the apparent specific resistance $\rho$ of the lying wall:

$$R_e = R_c + \rho * k.$$

As is indicated symbolically by the individual voltages $U_{12}$, $U_{23}$, $U_{13}$, an alternating voltage U is applied to two electrodes via a voltage source (not shown). As is indicated symbolically by the currents $I_{12}, I_{13}, I_{23}, I_{14}, I_{42}, I_{34}$, depending on the electrical resistance a current I is produced, and is measured by a measuring apparatus (not illustrated). The equivalent resistance can be calculated using $R_e = U/I$. This measurement is carried out in each case for all electrode pairings. Because of the geometrically symmetrical arrangement of the electrodes 4, 5, it is possible to assume that:

$$R_e 12 = R_e 13 = R_e 23$$

and $$R_e 14 = R_e 34 = R_e 42.$$

Consequently:

$$R_c 1 + R_c 2 + \rho * k = R_c 1 + R_c 3 + \rho * k = R_c 3 + R_c 2 + \rho * k$$

and $$R_c 1 + R_c 4 + \rho * k = R_c 2 + R_c 4 + \rho * k = R_c 3 + R_c 4 + \rho * k.$$

The individual resistances can be determined by solving the system of equations. The following measurement methods can then be used to determine the type of material:

The specific resistance ρ of the material, or the apparent specific resistance of a material mix, for example, of mineral and adjoining rock is determined by applying an alternative voltage U and injecting a current I between the electrode pairs formed with the central electrode 4 and the outer electrodes 5, and measuring these values. The measurement can be carried out both during a stationary sensor position and given moving sensor devices, and the measurement can be performed, for example, via the central electrode 4 or else a further measuring electrode.

The contact resistance as reference variable for the nature of the surface of the ground surface making contact with the sensor head, or the type of material thereof can also be derived from movements of the sensor device, for example upon movement of the working machine as working progresses. The movement of the sensor device or of the sensor head in a parallel fashion over the surface of the ground layer gives rise to changes in the contact resistance. The amplitude and frequency of these resistance fluctuations are a function of the nature of the surface of the material, since they are characteristic of specific natures of the surface and/or types of material.

Finally, the induced polarization can also be used in the case both of the movements of the sensor device and of sensor devices standing still. The polarization effect is of an electrochemical nature. It results, on the one hand, from differences in the ion conductivity of the stone and the electron conductivity of metallic stone particles, and on the other hand from a spatially dependent ion mobility which is caused by the changing pore size in the stone. Electrical work is thus required in order to be able to build up a polarization. Said work can be measured by applying a voltage U between the electrode pairs of the outer electrodes 5 and/or the electrode pairs of outer and inner electrodes 5, 4. If the voltage is switched off, the work stored in the ground is released once again in the form of electrical energy, and this can be seen, in turn, in the measured voltage profile.

Figure 4:
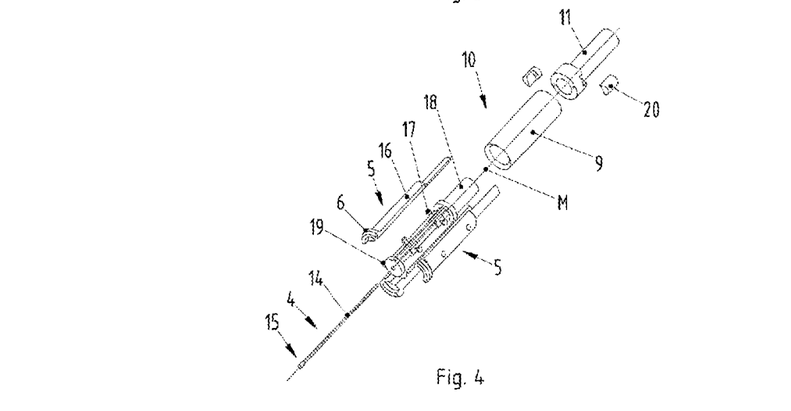
FIG. 4 shows the sensor from FIG. 1 in an exploded illustration.

Reference is now made again to FIG. 4, which shows, once more in an exploded illustration, the design of a preferred embodiment of the sensor device 10 for its installation in troughs of a conveyor in a winning machine. In order to enable the voltage supply or the connection of an electronic measuring system to the outer electrodes 5 and the central electrodes 4, the central electrode 4 comprises an electrode rod 14, arranged on the central axis M and having a thickened electrode head 15, while the individual outer electrodes 5 form elongated segment shells in the case of which there is integrally connected to the annular-segment web 6 at the rear in each case an elongated contact strip 16 which, if appropriate, in a fashion additionally set via a step, extends as far as the rear end of the housing formed by the front part 9 and rear part 11. The contact between the inner electrode 4 and the outer electrodes 5 can then be performed from the rear end of the housing 2, and to this extent in a protected region. The mounting of the outer electrodes 5, which are here in the form of segment shells, is performed via holding pins 17 onto which the contact strips 16 can be set. The entire sensor arrangement 10 comprises an inner body 18 which is preferably made from insulating plastic material such as, in particular, a thermoplastic, which can be reinforced with plastic fibres. The front part 9 of the housing 2 is pushed over the contact strips 16 in such a way that, in the mounted state, as shown in FIG. 1 by way of example, only the front, laterally projecting annular webs 6 of the outer electrodes 5 are exposed at the sensor measuring surface 3. The interspace between the annular webs 6 of adjacent outer electrodes 5 is filled here with radial webs which are preferably constructed in an integral fashion on the inner body 18, in particular on the section of the inner body 18 which forms the measuring surface 3. In the exemplary embodiment shown, the front part 9 and the rear part 11 are screwed to one another by means of screws which are not illustrated. Centring pins 20 can be fastened at the same time on the housing 2 of the sensor device 10 with the aid of the screw fitting. Not only can the centring pins 20 effect exact positioning of the sensor device 10 in attachments of the winning machine—they can also form a stop up to which the sensor head can be moved by means of the compression spring out of the bearing part of the winning machine.

Figure 5:
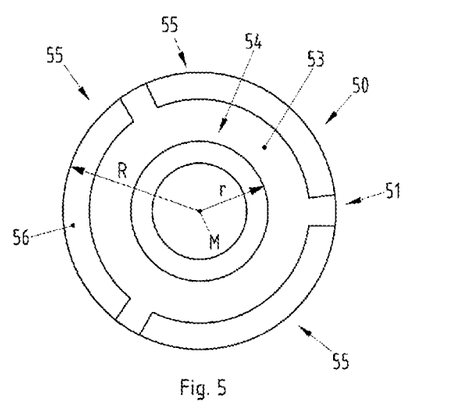
FIG. 5 shows a top view of a sensor head in accordance with a second exemplary embodiment with a ring/ring arrangement of the electrodes.

FIG. 5 shows in a very diagrammatically simplified fashion the sensor measuring surface 53 of a sensor head 51 of a sensor device 50 in accordance with a second exemplary embodiment. As with the first exemplary embodiment, the outer electrodes 55 are also implemented here with annular-segment webs 56, which preferably extend along the lateral surface of the sensor head 51 and over the sensor measuring surface 53, and in the case of which, in turn, a chamfer is formed, as described further above, between the sensor measuring surface 53 and the lateral surface. In a departure from the previous exemplary embodiment, however, here the inner electrode 54 on the sensor measuring surface 53 also consists of a ring. Consequently, a ring/ring arrangement of the electrodes 54, 55 is effected in the case of the sensor device 5. The annular-segment webs 56 of the outer electrodes 55 form a ring with a ring diameter R around the central axis M, and the inner electrode 54 forms a ring with the ring diameter r. Such a ring/ring arrangement forms a particularly advantageous geometrical distribution of the inner and outer electrodes 54, 56 for a ground prospecting in which the sensor measuring surface 53 of the sensor head 51 is only brought into contact with a surface of the ground. In particular, the prospecting depth can be determined approximately with the aid of the sensor measuring head 51 via the radius R of the outer electrodes 56, since the prospecting depth is governed approximately by once to twice the diameter of the outer radius R, that is to say about 2R to about 4R. The optimal ratio of the radii r to R, that is to say of the outer ring R to the inner ring r is approximately ⅓. The wall thickness of the individual rings should be approximately 1/10 of the diameter of the ring formed with the outer electrodes 55, that is to say about R/5, it being particularly advantageous when the ring diameter 2R formed with the outer electrodes 55 is not smaller than about 60 mm. The individual annular webs 56 of the outer electrodes 55 should here have a spacing which is at least 2 mm and, in turn, as described further above, be filled with an insulating material such as, however, a thermoplastic. Voltages can be applied between individual electrodes 54, 55 owing to the insulating material. It goes without saying that, to this end, the individual electrodes 54, 55 must be electrically conductive so that, as described further above, they accept the application from the rear side of a sensor device, and/or can be used as measuring electrodes. The plastic used for the purpose of insulation on the measuring surface 53 should preferably have a wear resistance. This can be achieved, for example, with fibres in conjunction with a correspondingly modified thermoplastic.

The prospecting depth with the sensor devices 10 or 50 has a ratio of 1/1 to ½ to the electrode diameter. It will be possible to achieve a maximum prospecting depth of about 120 mm in the case of a sensor device with outer electrodes which form a sensor head with a 60 mm diameter. The resolution of the sensor is a function of the prospecting depth. The relation is about 1/10. In a prospecting depth of 120 mm, it is therefore possible to detect layer profiles in a mineral deposit with an accuracy of 12 mm. The measurement currents and voltages which are fed into an inventive sensor device can be kept low;

the power required to build up external potential fields can preferably remain far below 2W and, to this extent, also meet requirements for explosion protection.

Figure 6:
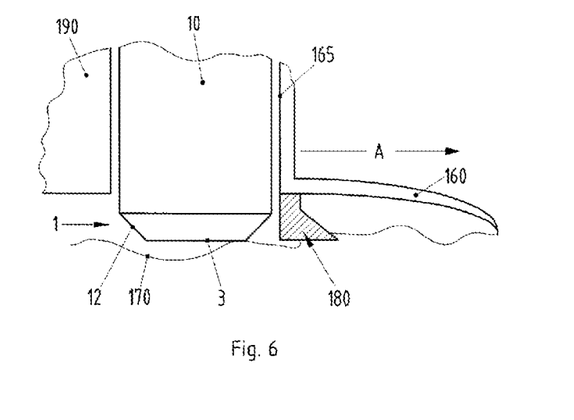
FIG. 6 shows a diagrammatically greatly simplified sectional view of the integration of the sensor device in a trough pan in accordance with a first alternative embodiment.

FIG. 6 shows by way of example in a very schematically simplified illustration a trough 190 such as can be used, for example, as a conveying trough with an integrated machine track 160 on an underground scraper chain conveyor. A winning machine such as, for example, a coal plough can be supported on the track 160. In the exemplary embodiment shown, there is formed in the trough 190 in a fashion as near as possible behind the machine track 160 and, to this extent, relatively near the working front, a cutout 165 in which the sensor device 10 as described in FIGS. 1 to 3 can be arranged. In FIG. 6, the reference numeral 170 illustrates the surface of the ground to be prospected such as, in particular, the surface of a mineral deposit, which is shown here with a strong corrugation. Even in the case of a corrugated profile, it is rendered possible to use the sensor device 10 to make contact with the ground surface 170, since the sensor measuring surface 3 on the sensor head 1 projects correspondingly far over the underside of the machine track 160. FIG. 6 also illustrates again the circumferential chamfer 12 on the sensor head 1. As an additional protective measure, it is possible to arrange here underneath the machine track 160, at least in the direction of movement A of the winning machine, a scraping edge 180 which protects the sensor head 1 against damage by steps or edges in the ground layer by shearing these off, if appropriate.

Figure 7:
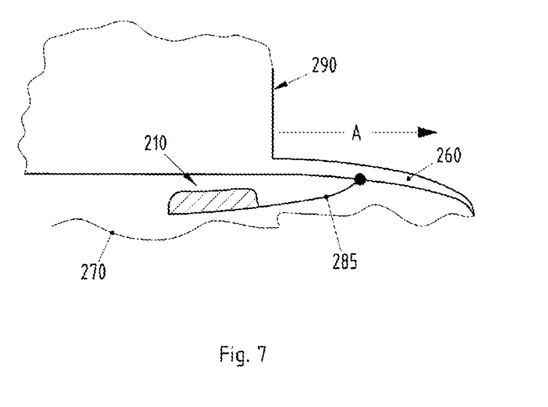
FIG. 7 shows a diagrammatically greatly simplified sectional view of the integration of the sensor device in a trough pan in accordance with a second alternative embodiment.

FIG. 7 shows an alternative exemplary embodiment of a sensor device 210, which is indicated here only diagrammatically, is flat overall and is arranged overall on the underside of a trough 290, again only indicated, with a machine track 260. The sensor device 210 can here be pivotably hinged on the underside of the machine track 260 via a pivot arm 285 and a pivot joint such that it is able as a rule to bear at any time against the surface, indicated by 270, of the mineral deposit because of the forces of gravity. Since no projecting sensor parts are present, there is no risk of shearing off at the sensor head.

The preceding description results for the person skilled in the art in numerous modifications which are to fall under the scope of protection of the dependent claims. Sensors and/or sensor devices for integration in machine parts, in particular troughs for the mostly underground working of coal beds as mineral deposits are shown in all the exemplary embodiments. The shaping of the housing is therefore mostly adapted to be able to arrange the sensor devices in cylindrical receptacles. In the case of other applications to ground prospecting the shape of the housing can deviate fundamentally and be square, rectangular, round, flat etc. in design. The exemplary embodiments respectively show round sensor heads. This shape, as well, could be modified, and the mode of functioning would also then be given when two square or triangular electrodes are arranged, or the inner electrode is square or triangular and the outer electrodes are linear. The spacing/resistance characteristic would remain unchanged and would merely be displaced. Furthermore, the exemplary embodiments exclusively show sensor heads with electrodes which are distributed uniformly and/or symmetrically, since in the case of a uniform geometrical distribution of the electrodes, correspondingly uniformly arranged electrode pairs result which substantially simplify the complicated outlay on determining and ascertaining the apparent resistance. However, it would also be possible to arrange the electrodes non-uniformly, in which case the different spacings between the electrode pairs must be taken into account.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A sensor device for the geoelectrical prospecting of raw mineral deposits, in particular in continuous exploiting of the mineral deposits, the sensor device comprising a sensor head whose front surface forms a sensor measuring surface, the sensor device further comprising at least one electrode and the sensor head being contactable with a ground surface, wherein the sensor device is configured to determine one or more characteristics of the ground terrain based on data measured by the sensor device as the sensor measuring surface moves across the ground surface, and wherein a central electrode and a plurality of outer electrodes are arranged on the sensor measuring surface, wherein at least a portion of the central electrode and at least a portion of each of the plurality of outer electrodes on the sensor measuring surface are contactable with the ground surface as the sensor measuring surface moves across the ground surface, and wherein the sensor device detects the mineral deposits within the ground based upon measuring the resistance between any two of a group comprising the central electrode and the plurality of outer electrodes as the sensor measuring surface moves across the ground surface, the plurality of outer electrodes being uniformly arranged around the central electrode, and the central electrode and the plurality of outer electrodes being electrically conductive and electrically separated from one another.

2. The sensor device according to claim 1, wherein the central electrode on the sensor measuring surface has a triangular front surface, and the outer electrodes on the sensor surface have a linear front surface and are respectively arranged parallel to one of the side legs of the central electrode.

3. The sensor device according to claim 1, wherein the central electrode on the sensor measuring surface is designed as a point electrode.

4. The sensor device according to claim 1, wherein the central electrode on the sensor measuring surface is designed as a ring electrode.

5. The sensor device according to claim 4, wherein the plurality of outer electrodes on the sensor measuring surface are respectively designed as point electrodes.

6. The sensor device according to claim 3, wherein the plurality of outer electrodes on the sensor measuring surface are respectively designed as point electrodes.

7. The sensor device according to claim 1, wherein the plurality of outer electrodes on the sensor measuring surface are designed as annular-segment electrodes and are arranged annularly around the central electrode.

8. The sensor device according to claim 1, wherein the sensor device comprises a cylindrical housing with cylinder ends, with the sensor head being arranged at one of the cylinder ends.

9. The sensor device according to claim 7, wherein the annular-segment electrodes on the sensor measuring surface are designed as annular-segment webs which extend on a front surface of the sensor head and on a lateral surface of the sensor head.

10. The sensor device according to claim 9, wherein the annular-segment webs are provided at the transition of the front surface into the lateral surface with a chamfer.

11. The sensor device according to claim 10, wherein the chamfer is 45°.

12. The sensor device according to claim 7, wherein the plurality of outer electrode on a rear side of the annular-segment web is provided with a contact strip which extends up to the rear end of the housing.

13. The sensor device according to claim 8, wherein the housing is provided with a step, the step shoulder forming a bearing surface for a compression spring.

14. The sensor device according to claim 13, wherein the housing is of multipart design and has a rear part comprising the step shoulder, and a front part provided with the sensor head, it being possible to screw the housing parts to one another through the step shoulder.

15. The sensor device according to claim 14, wherein centering pins can be detachably fastened on the housing with the aid of the screw fitting.

16. The sensor device according to claim 7, wherein the inner electrode has an inner electrode radius to a central axis and the plurality of outer electrodes have an outer electrode radius to the central axis, the sensor device having a radius ratio between the inner electrode radius and the outer electrode radius of ⅓.

17. The sensor device according to claim 7, wherein the plurality of outer electrodes form a ring with a ring diameter and an outer electrode radius to a central axis, the outer electrode ring having at least one of the ring diameter being at least 60 mm, a width in the radial direction of 1/10 the outer electrode ring radius, and the spacing between two adjacent outer electrodes being at least 2 mm, the spacing being filled with insulation material.

18. The sensor device according to claim 1, wherein the plurality of outer electrodes on the sensor measuring surface consist of steel.

19. The sensor device according to claim 1, wherein the interspace between the plurality of outer electrodes and the central electrode on the sensor surface is filled up with a plastic.

20. The sensor device according to claim 19, wherein the plastic is a fibre-reinforced thermoplastic.

21. The sensor device according to claim 1, wherein the sensor device can be used on a trough element of an underground winning machine, in particular an underground coal winning machine.

22. The sensor device according to claim 21, wherein the sensor device can be inserted into a downwardly open, cylindrical cutout on the trough element.

23. The sensor device according to claim 21, wherein the sensor head is arranged on a pivot arm which is pivotally supported on the underside of the trough element.

24. A method for the geoelectrical prospecting of raw mineral deposits in the ground, particularly in continuous working of the mineral deposits, a potential field being built up in the ground with aid of a sensor device, the method comprising:
providing a sensor device having a sensor head whose front surface forms the sensor measuring surface and which has at least one electrode, the sensor head capable of being engaged with a surface of the ground and has on the sensor measuring surface a central electrode and a plurality of outer electrodes which are arranged distributed geometrically uniformly around the central electrode, wherein at least a portion of the central electrode and at least a portion of each of the plurality of outer electrodes on the sensor measuring surface are contactable with the surface of the ground as the sensor measuring surface moves across the surface of the ground, and wherein the sensor device detects the mineral deposits within the ground based upon measuring the resistance between any two of a group comprising the central electrode and the plurality of outer electrodes as the sensor measuring surface moves across the ground surface, the central electrode and the outer electrodes being electrically conductive, electrically separated from one another, and forming electrode pairs with the aid of which a potential field is built up and the current produced is measured;
engaging the sensor device against the surface of the ground; and
determining one or more characteristics of the ground terrain based on data measured by the sensor device as the sensor device moves across the surface of the ground.

25. The method according to claim 24, further including the steps of measuring the equivalent resistance between all the electrode pairs of the sensor head and prospecting the specific resistance of the material in the ground in front of the sensor head making contact with the surface of said ground.

26. The method according to claim 24, further including the steps of moving the sensor head along the surface and measuring changes in the contact resistance between the electrodes of the electrode pair in order to determine the surface.

27. The method according to claim 24, further including the steps of determining at least one of the potential fields and the contact resistance without penetrating into the ground with the sensor head.

28. The method according to claim 24 further including the step of short circuiting at least two electrodes to form a large electrode.

29. The sensor device according to claim 1, wherein the centering electrode is configured to measure a specific resistance of material in the ground terrain following an application of a voltage across a pair of electrodes.

30. The sensor device according to claim 1, wherein the sensor device is configured to determine an amplitude and a frequency of resistance fluctuations to determine changes in the ground surface.

31. The sensor device according to claim 1, wherein the sensor device is configured to determine the one or more characteristics about the ground terrain based on electrical work via induced polarization, the electrical work being measured by applying a voltage across a pair of electrodes and switching off the voltage to receive electrical energy released from a charge stored in the ground terrain.

32. A sensor device for the geoelectrical prospecting of raw mineral deposits, in particular in continuous exploiting of the mineral deposits, the sensor device comprising a sensor head whose front surface forms a sensor measuring surface, the sensor device further comprising at least one electrode and the sensor head being contactable with a ground surface, wherein the sensor device is configured to determine one or more characteristics of the ground terrain based on data measured by the sensor device when at least a portion of the sensor measuring surface is in contact with the ground surface, and wherein a central electrode and a plurality of outer electrodes are arranged on the sensor measuring surface, wherein at least a portion of the central electrode and at least a portion of each of the plurality of outer electrodes on the sensor measuring surface are contactable with the ground surface, and wherein the sensor device detects the mineral deposits within the ground based upon measuring the resistance between any two of a group comprising the central electrode and the plurality of outer electrodes as the sensor measuring surface is in contact with the ground surface, the plurality of outer electrodes being uniformly arranged around the central electrode, and the central electrode and the plurality of outer electrodes being electrically conductive and electrically separated from one another.

33. The sensor device of claim 32, wherein the sensor head is stationary.

\* \* \* \* \*